Nov. 25, 1952  E. H. HORNBARGER  2,618,969

ELECTRICAL DYNAMOMETER CONTROL SYSTEM

Filed July 12, 1950

INVENTOR

Earl H. Hornbarger.
BY
Paul E. Friedemann
ATTORNEY

Patented Nov. 25, 1952

2,618,969

UNITED STATES PATENT OFFICE 2,618,969

ELECTRICAL DYNAMOMETER CONTROL SYSTEM

Earl H. Hornbarger, Kenmore, N. Y., assignor to Westinghouse Electric Corporation, East Pittsburgh, Pa., a corporation of Pennsylvania Application July 12, 1950, Serial No. 173,436

10 Claims. (Cl. 73—116)

1

This invention relates generally to systems of control for dynamoelectric machines, and more in particular to a dynamometer system utilizing a rotating electrical machine as a power transmitting and a load absorbing unit.

One object of this invention is to provide a system of field control for a dynamoelectric machine which is simple in its elements and positive in operation.

Another object of this invention is to provide a system of field control for a dynamoelectric machine which affords adjustment of field current down to zero but which under certain operating conditions prevents a reduction of field current below a predetermined safe minimum value.

A further object of this invention is to provide a dynamometer control arrangement having a rotating electrical machine as a load absorbing and power transmitting unit wherein provision is had for the selective control of the machine for fast and slow motoring operation and for load absorbing generating operation.

It is also an object of this invention to provide in a system of the character referred to in the preceding object a field control for the dynamoelectric machine which prevents reduction of field current to zero except under predetermined conditions.

Figure 1:
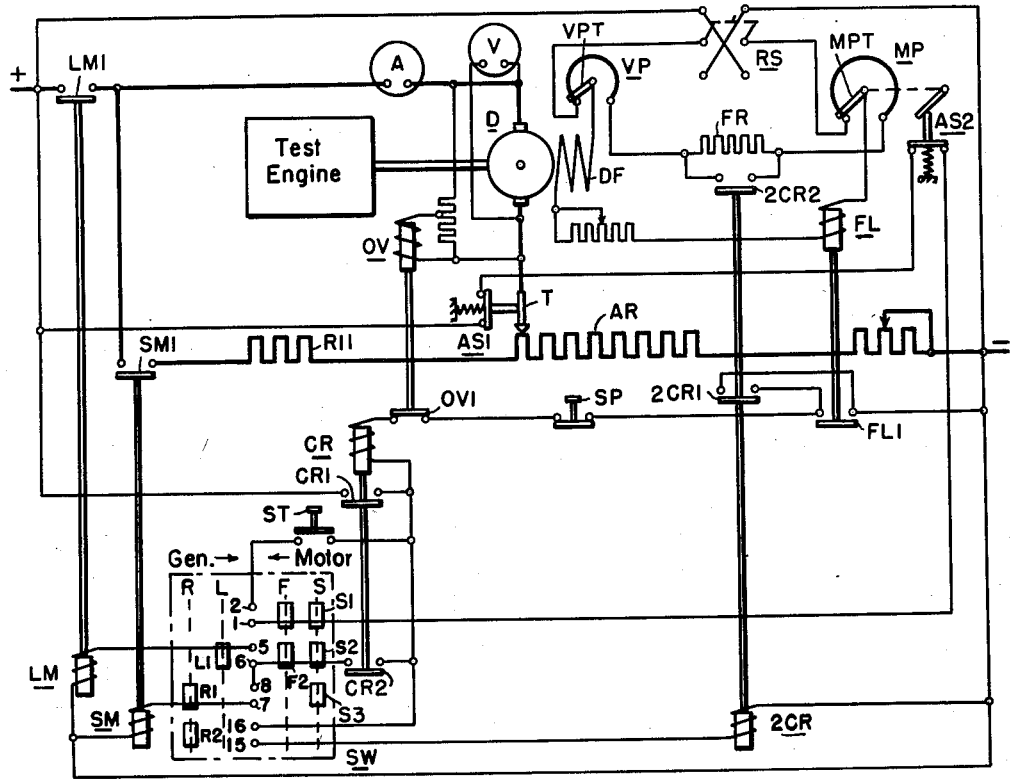
Figure 2:
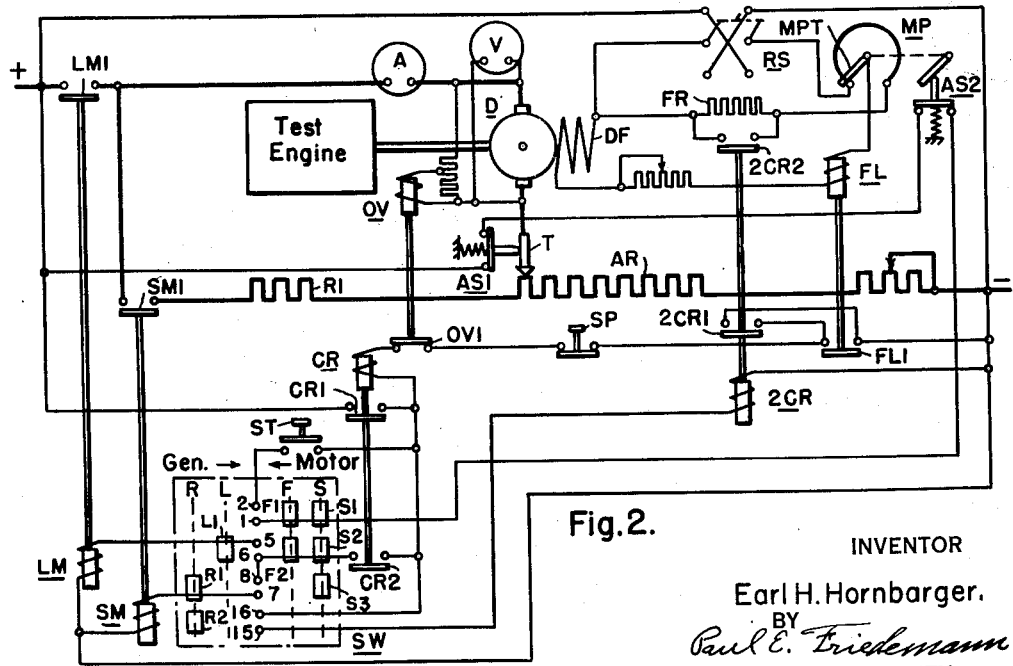

Other objects and advantages will become apparent from a study of the following disclosure when considered in conjunction with the accompanying drawings, in which:

Figure 1 illustrates diagrammatically a dynamometer control system embodying the principles of this invention; and Fig. 2 illustrates diagrammatically a modification of the invention shown in Fig. 1.

In Fig. 1 the engine to be tested is coupled to the shaft of a dynamoelectric machine D which is of the direct current type and which is provided with a separately excited field winding designated DF. The armature winding of this machine is connected across the direct current supply conductors designated by the plus and minus signs, and has connected in series therewith an armature rheostat designated AR which is provided with a movable tap designated T. The field winding DF is connected between the movable taps VPT and MPT, respectively, of the vernier potentiometer VP and the main potentiometer MP which control the excitation of the field winding DF. Potentiometers VP and MP are connected in series across the supply conductors through a reversing switch RS, and a

2 field resistor designated FR is connected in series between the two potentiometers. The connection of the armature circuit across the supply conductors is controlled by a pair of contacts LM1 and SM1, respectively, of the contactors LM and SM. Operation of the contacts LM1 to closed position connects the armature winding of the dynamoelectric machine D across the supply conductors, and a control of the armature current may then be obtained by adjustment of the movable tap T along the armature rheostat AR. With the contacts LM1 closed, provision is had additionally for the closing of the contacts SM1 for certain operating conditions, in which case a shunt circuit around the motor armature is provided which includes a resistor R11 in series with the contacts SM1. Thus an additional control of dynamoelectric machine armature current is provided by means of the shunting circuit including the contacts SM1.

The control system is organized to provide the following operating conditions of the dynamoelectric machine D:

1. As a motor with contacts LM1 closed and contacts SM1 open.
2. As a motor with contacts LM1 and SM1 both closed to give slow speeds of motor operation by armature shunting.
3. As a generator feeding back into the line with only contacts LM1 closed. This would be the operating condition in which the test engine would be driving the dynamoelectric machine.
4. As a generator loading on resistor AR, in which case only the contacts SM1 are closed.

The operating conditions under setup No. 4 hereinabove described wherein the dynamoelectric machine is connected across predetermined tapped portions of the armature rheostat AR requires very low excitation of the field winding DF. Thus the field excitation circuit is of the potentiometer type so that by suitable adjustment of the taps of these potentiometers the field current may be reduced to a very low value. For the positions of the taps of the potentiometers illustrated, full voltage is applied to the field winding DF and by rotation of the taps in a clockwise direction as viewed, in each case, the potentiometer voltage in the field circuit, with the taps in their extreme positions, is zero and the only voltage which remains is that due to the voltage drop across the field resistor FR. It will be appreciated that if the field resistor FR were not included in series between the two potentiometers that the excitation of the field winding DF could be reduced completely to zero, and this is accomplished by shunting the field resistor by means of a set of contacts 2CR2 of a control relay 2CR. However, it is essential that this shunting action be applied at the proper time, otherwise under certain conditions the speed of the dynamoelectric machine due to its weakened field may increase dangerously. Accordingly, provision is had in the present control system for properly controlling the operation of the relay 2CR.

The various operations of the dynamoelectric machine hereinabove enumerated are selected by means of a selector switch designated SW. Four switch positions are illustrated, two on each side of the center or off position on which the switch is shown. The contact sections in the columns F and S which are to the right of the central position of the switch respectively provide fast and slow motoring operation, while the contact positions on the left of the central position of the switch provide generating operation, the column designated L establishing connections whereby the generated voltage of the dynamoelectric machine when driven by the test engine is fed back to the supply line indicated, while the contacts in the column designated R establish connections whereby the dynamoelectric machine D is connected across predetermined tapped portions of the armature rheostat AR to load thereon.

A control relay CR establishes energizing circuits for the relays LM and SM which are selectively controlled through the selector switch. This relay is picked up by the start push button ST after power has been applied to the positive and negative supply conductors indicated.

Control relay 2CR is also controlled by the control relay CR and is energized only when the selector switch is in the position R.

A field loss relay FL is connected in series in the circuit for the field winding DF. This relay is provided as a protective feature which upon the reduction of field current below a predetermined safe minimum value, or should failure of the power supply occur, will drop out opening its contacts FL1 which are connected in series with the coil of the relay CR, thereby dropping the relay CR which in turn drops out relays LM or SM, or both, depending upon their energization to disconnect the armature winding of the dynamoelectric machine.

This circuit arrangement is set up primarily for the testing of internal combustion engines. Accordingly, it is always desirable to start the system with the dynamoelectric machine functioning as a motor. This will be appreciated from the consideration that for motoring tests of the test engine the dynamoelectric machine is operated as a motor, while if the test engine is to drive the dynamoelectric machine it must be started by some means and this is conveniently accomplished by cranking the engine with the dynamoelectric machine operating as a motor before the actual test with the test engine driving the dynamoelectric machine functioning as the load absorbing unit is made. In order to obviate the possibility of starting the dynamoelectric machine as a motor with the full supply voltage on the armature and with small field excitation, interlock switches AS1 and AS2 are provided. The interlock switch AS1 is operated to its closed position by the movable tap T of the armature rheostat AR. This movable tap T must be in its extreme left-hand position as viewed to close the switch AS1, in which case the entire resistance of this armature rheostat is connected in series with the armature winding of the dynamoelectric machine to thereby limit the magnitude of the armature current during starting. Similarly the movable tap MPT of the main potentiometer MP must be in its extreme counterclockwise position, which is the position in which all of the resistance of the main potentiometer MP is applied across the field winding DF and the field is accordingly highly excited. The interlock switches AS1 and AS2 are connected in series in the energizing circuit for the relay CR. Thus this relay may not be energized unless the conditions hereinabove enumerated are fulfilled so that both of the interlock switches are closed.

To start the system, the supply conductors designated + and — are energized. The energizing means for these conductors has not been illustrated since it may be of conventional form, and per se forms no part of this invention. Upon closure of the reversing switch RS in the direction to apply the required polarity of field excitation, the main and vernier potentiometers MP and VP are energized. With the potentiometers set in the position illustrated, maximum field is applied to the field winding DF. Selector switch SW is now moved to either of the fast or slow motoring positions. In the slow position, which is preferably employed in starting, the contact segments S1, S2 and S3 respectively bridge the contact terminals 1 and 2, 5 and 6, and 7 and 8 of the selector switch assembly. Upon closure of the start push button ST, an energizing circuit for the control relay CR is completed, beginning at the positive side of the supply circuit and extending through the contacts AS1, the contacts AS2, the selector switch segment S1, the start push button ST, the coil of control relay CR, the contacts OV1 of overvoltage relay OV, the stop push button SP and the contacts FL1 of the field loss relay to the negative side of the line. Control relay CR now picks up closing its contacts CR1 and CR2. Contacts CR1 parallel the contacts AS1, AS2, the selector switch contact S1 and the start push button ST, thereby forming a holding circuit for this relay independently of the mentioned contacts. Contacts CR2 in conjunction with the contacts CR1 complete an energizing circuit for the coils of both of the relays LM and SM, the circuit for the relay LM including the contacts CR1, CR2, contact segment S2 and the coil of the relay LM to the negative side of the line, while that for the relay SM includes contacts CR1, CR2, selector switch segment S3 and the coil of the relay SM to the negative side of the line. Thus both contacts LM1 and SM1 are closed, the contacts LM1 completing the armature winding circuit across the direct current supply and the contacts SM1 connecting the shunt circuit resistor R11 across the armature winding of the dynamoelectric machine. The resistor R11 prevents complete short-circuiting of the armature winding and the speed at which the dynamoelectric machine will operate is then determined by adjustment of movable tap T along the armature rheostat AR which simultaneously decreases the armature winding series circuit resistance while increasing the resistance of the shunt circuit to progressively increase the armature current and hence increase the motor speed. The speed of the motor may be further controlled by weakening of the motor field below the full field condition presently existing. This is accomplished by rotating the movable tap of potentiometer MP in a clockwise direction to progressively decrease the voltage applied to the field winding DF. Any predetermined voltage within the range afforded by this potentiometer may be selected for exciting the field and this voltage may be accurately set once it is approximated at the main potentiometer by adjustment of the tap on the vernier potentiometer VP. With both potentiometers MP and VP set in their extreme clockwise positions as viewed, the field excitation is determined entirely by the voltage drop across the field resistor FR. Hence irrespective of the setting of the potentiometers, field excitation may not be reduced to zero because of the presence of the field resistance FR in the circuit. As a consequence, at no time under this operating condition may loss of field result from operation of the field excitation potentiometers. The test engine may therefore be driven at speeds ranging from substantially zero speed to the maximum speed afforded by the setting of the selector switch in its slow speed position.

To obtain higher speeds of the dynamoelectric machine for motoring, the selector switch SW is moved to position F. Operation of the switch does not affect the control relay CR, since its holding circuit through the contact CRI is independent of the position of the selector switch. However, relays LM and SM are momentarily deenergized during the movement from the fast to the slow position. In the fast position the relay LM is energized, but no energizing circuit is provided for the relay SM. Consequently, the shunt circuit established by contacts SMI is now open, and control of the dynamoelectric machine by armature voltage variation is now obtained through the amount of series resistance which is inserted in the armature circuit by the adjustable tap T. Since the armature shunt circuit has been removed, the armature currents are correspondingly higher and as a consequence a higher base speed of the motor is obtainable. The other components of the circuit hereinabove considered in connection with the slow speed condition function in the manner previously described.

Movement of the selector switch to position L energizes only the relay LM. In this position the test engine is to drive the dynamoelectric machine. Hence the dynamoelectric machine will function as a generator, and since the switch LM is closed the generated voltage is fed back to the supply lines and a control of the voltage is obtainable again by adjustment of the movable tap of the armature rheostat. Similarly the field excitation which is desired is controlled by movement of the taps of the main and vernier potentiometers MP and VP respectively.

In position R of the selector switch, the relay LM is deenergized and the relay SM is energized connecting the armature winding of the dynamoelectric machine across the shunt circuit resistor RII and a tapped portion of the armature rheostat AR. In this position of the selector switch the energizing circuit for the coil of relay SM includes the contacts CRI, CR2, switch segment RI and the coil of relay SM across the supply conductors. Additionally, in this position the selector switch SW energizes relay 2CR in a circuit including contact CRI, selector switch segment R2 which bridges contact terminals 15 and 16, and the coil of relay 2CR across the positive and negative supply conductors. Relay 2CR is now energized closing its contacts 2CRI and 2CR2. Contacts 2CRI parallel the contacts FLI of field loss relay, and contacts 2CR2 shunt the field resistor FR from its position in series between the main and vernier potentiometers controlling the excitation of field DF. With the test engine driving the dynamoelectric machine, the armature voltage is now applied across the shunt resistor RII and that tapped portion of the armature rheostat AR determined by the setting of the movable tap T. With field resistor FR shunted from the circuit, the value of field excitation may now be dropped to zero by adjustment of the potentiometers VP and MP to obtain the desired load absorbing characteristics for the dynamoelectric machine D. As a consequence the field loss relay FL drops out at this low value of excitation. However, it is no longer effective to stop the system since its contacts are parallel by the now closed contacts 2CRI of the control relay 2CR. Accordingly, the full range of control which is desired may now be exercised without shutdown of the system.

It will thus be appreciated that the function of the control relay 2CR and field resistor FR automatically sets a minimum on the field current regardless of the position of the potentiometers VP and MP, for any of the selector switch positions F, S and L and that control of the field down to zero field current is obtainable in the position R without affecting shutdown of the system due to the protective function of the field loss relay FL. The resistor FR is selected and adjusted to give the minimum safe voltage drop across the shunt field, that is a value that will insure a field current sufficient to limit maximum motor speed to rated value.

If desired the field loss relay FL may be eliminated from this circuit, since its function is merely that of protecting the system against field failure. Failure of field excitation without power failure in the supply conductors is not very likely, and hence the additional expense of this relay may be eliminated by leaving the relay out of the system.

With the field loss relay in the system and without the field resistor FR, it would be possible for the operator to weaken the field DF to a dangerous value. To obviate this possibility it would be necessary for the operator to suitably mark the potentiometers, or at least mark the main potentiometer, for that value of voltage below which it would not be safe to go. Otherwise the field voltage would drop sufficiently to drop the field loss relay FL which would immediately shut down the system and stop the test operation.

The embodiment of the invention illustrated in Fig. 2 is similar to that shown in Fig. 1. Accordingly, parts similar to those shown in Fig. 1 have been given like reference characters. The primary difference in the two figures resides in the field excitation circuit for the dynamoelectric machine. In this circuit the fine adjustment features offered by the vernier potentiometer have been removed by eliminating this potentiometer from the circuit. As illustrated, the main potentiometer MP is connected in series with the field resistor across the positive and negative conductors through the reversing switch RS. The field winding DF is now connected between the movable tap MPT of the main potentiometer and the side of the field resistor FR remote from the main potentiometer. The field voltage is therefore determined by the voltage drop across the tapped portion of the main potentiometer and the field resistor FR. The field loss relay FL is again illustrated with its coil connected in series with the field winding DF. As noted in connection with Fig. 1, this relay may be eliminated from the circuit. The remaining circuit components and their connection, and the general function of this system, is the same as that illustrated in Fig. 1. Accordingly, the description concerning Fig. 1 is believed to make the operation of this circuit of Fig. 2 self-evident.

It will be appreciated by those skilled in the art that numerous variations in the system by substitution of equivalent circuit elements for those illustrated and by variations in the circuit connections may be obtained without departing from the spirit and scope of this invention. Accordingly, it is intended that the foregoing disclosure and the showings made in the drawings shall be considered only as illustrative and not construed in a limiting sense.

I claim as my invention:

1. In a dynamometer control, the combination of, a dynamoelectric machine having a rotor for connection to a motor to be tested, an armature winding on said rotor, a field winding for the dynamoelectric machine, a variable load resistor have a tapped portion connected in series with said armature winding, a selector switch control operable in one position to connect said armature winding and said tapped portion of said load resistor to a supply of direct current and in a second position operable to connect said armature winding in a closed loop including the remaining tapped portion of said load resistor, a field excitation circuit including a potentiometer having a movable tap and a resistor connected in series with the potentiometer, circuit means connecting said field winding to said movable tap and to the side of said resistor remote from said potentiometer, a normally open switch connected across said resistor, and electrical means connected with said selector switch control to be energized thereby in said second position for closing said switch.

2. Dynamometer apparatus for testing a motor comprising, in combination, a dynamoelectric machine adapted to be mechanically connected to said motor, an armature winding on said dynamoelectric machine, a field winding on said dynamoelectric machine, a load impedance device connected with said armature winding, movable control means for selectively connecting said armature winding and one part of said load impedance to a supply of direct current in one position and in a second position operable to connect said armature winding and another part of said load impedance in a closed loop, a field excitation circuit comprising a pair of potentiometers each having a movable tap, a resistor connected in series between said potentiometers, circuit means connecting said field winding to the movable taps to be energized in dependence of the difference of the tapped voltages, switch means connected across said resistor and electrical means controlled by said control means for closing said switch means when said control means is in said second position.

3. Dynamometer apparatus for testing a motor comprising, in combination, a dynamoelectric machine having a shaft for connection to said motor, an armature winding for said dynamoelectric machine, a field winding for said dynamoelectric machine, a variable load resistor having a tapped portion connected in series with said armature winding, a selector switch control operable in one position to connect the tapped portion of said load resistor and said armature winding to a supply of direct current and operable in a second position to connect the remaining tapped portion of said load resistor in a closed loop with said armature winding, a field excitation circuit including two potentiometers, a resistor connected between said potentiometers in series therewith, circuit means connecting said field winding between said movable taps, a normally open switch assembly connected in parallel with said resistor, and electrical means connected with said selector switch control to be energized thereby in said second position for closing said switch assembly.

4. Dynamometer apparatus for testing a motor comprising, in combination, a dynamoelectric machine having a shaft for connection to said motor, an armature winding for said dynamoelectric machine, a field winding for said dynamoelectric machine, a variable impedance device having a movable tap, one end of said armature winding being connected to said movable tap, a first set of contacts connected with the remaining end of said armature winding, an impedance device, a second set of contacts, circuit means connecting said impedance device and said second set of contacts in series between said remaining end of said armature winding and one end of said variable impedance device, the remaining end of said variable impedance device and said first set of contacts being adapted for connection to a supply of electrical energy, a selector switch control operable in one position to close said first set of contacts and in a second position to open said first set of contacts and to close said second set of contacts, a field excitation circuit having two potentiometers, each potentiometer having a movable tap, a resistor connected between said potentiometers in series therewith, a set of normally open contacts connected in parallel with said resistor, circuit means energized upon movement of said selector switch control to said second position for closing said last-mentioned set of contacts, and circuit means connecting said field winding between the movable taps of said potentiometers.

5. Dynamometer apparatus for testing a motor comprising, in combination, a dynamoelectric machine having a shaft for connection to said motor, an armature winding for said dynamoelectric machine, a field winding for said dynamoelectric machine, a variable impedance device having a movable tap, one end of said armature winding being connected to said movable tap, a first set of contacts connected with the remaining end of said armature winding, an impedance device, a second set of contacts, circuit means connecting said impedance device and said second set of contacts in series between said remaining end of said armature winding and one end of said variable impedance device, the remaining end of said variable impedance device and said first set of contacts being adapted for connection to a supply of electrical energy, a selector switch control operable in one position to close said first set of contacts and in a second position to open said first set of contacts and to close said second set of contacts, a field excitation circuit including a potentiometer having a movable tap, a resistor connected in series with said potentiometer, circuit means connecting one side of said field winding to said movable tap and the other side thereof to the side of said resistor remote from said potentiometer, a set of normally open contacts connected in parallel with said resistor, and electrical means energized by said selector switch control in said second position thereof for closing said last-mentioned set of contacts.

6. Dynamometer apparatus for testing a motor comprising, in combination, a dynamoelectric machine having a shaft for connection to said motor, an armature winding for said dynamoelectric machine, a field winding for said dynamoelectric machine, a variable impedance device having a movable tap, one end of said armature winding being connected to said movable tap, a first set of contacts connected with the remaining end of said armature winding, an impedance device, a second set of contacts, circuit means connecting said impedance device and said second set of contacts in series between said remaining end of said armature winding and one end of said variable impedance device, the remaining end of said variable impedance device and said first set of contacts being adapted for connection to a supply of electrical energy, a selector switch control operable in one position to close said first set of contacts and in a second position to open said first set of contacts and to close said second set of contacts, a control circuit for energizing said selector switch control, a field excitation circuit having two potentiometers, each potentiometer having a movable tap, a resistor connected between said potentiometers in series therewith, a circuit means connecting said field winding between the movable taps of said potentiometers, a field loss relay having a coil electrically connected to said field winding to be energized by an electrical quantity thereof and a normally open set of contacts connected in series in said control circuit, a control relay having a coil energized by said selector switch control in said second position thereof and having two sets of normally open contacts, circuit means connecting one set of contacts of said control relay in parallel with said resistor, and circuit means connecting the other set of contacts of said control relay in parallel with the contacts of said field loss relay.

7. Dynamometer apparatus for testing a motor comprising, in combination, a dynamoelectric machine having a shaft for connection to said motor, an armature winding for said dynamoelectric machine, a field winding for said dynamoelectric machine, a variable impedance device having a movable tap, one end of said armature winding being connected to said movable tap, a first set of contacts connected with the remaining end of said armature winding, an impedance device, a second set of contacts, circuit means connecting said impedance device and said second set of contacts in series between said remaining end of said armature winding and one end of said variable impedance device, the remaining end of said variable impedance device and said first set of contacts being adapted for connection to a supply of electrical energy, a selector switch control operable in one position to close said first set of contacts and in a second position to open said first set of contacts and to close said second set of contacts, a control circuit for energizing said selector switch, a field excitation circuit including a potentiometer having a movable tap, a resistor connected in series with said potentiometer, circuit means connecting one side of said field winding to said movable tap and the other side thereof to the side of said resistor remote from said potentiometer, a field loss relay having a coil electrically connected to said field winding to be energized by an electrical quantity thereof and a normally open set of contacts connected in series in said control circuit, a control relay having a coil energized by said selector switch control in said second position thereof and having two sets of normally open contacts, circuit means connecting one set of contacts of said control relay in parallel with said resistor, and circuit means connecting the other set of contacts of said control relay in parallel with the contacts of said field loss relay.

8. In a control system, the combination of, a dynamoelectric machine having an armature winding and a field winding, an impedance device, a selector switch operable in one position for connecting said impedance device across said armature winding, a field excitation circuit including a potentiometer having a movable tap and a resistor connected in series therewith, circuit means for connecting said field winding between said movable tap and the side of said resistor remote from said potentiometer, an electrically operated contact device having a set of normally open contacts connected across said resistor, and circuit means connecting said selector switch and said electrically operated contact device for energizing said last-named device upon movement of said selector switch to said one position.

9. In a control system, the combination of, a dynamoelectric machine having an armature winding and a field winding, an impedance device, a selector switch operable in one position for connecting said impedance device across said armature winding, a field excitation circuit including two potentiometers each having a movable tap, a resistor connected in series between said potentiometers, circuit means for connecting said field winding between said movable taps, and circuit means responsive to movement of said selector switch to said one position for shunting said resistor.

10. In a control system, the combination of, a dynamoelectric machine having an armature winding and a field winding, an impedance device, a selector switch operable in one position for connecting said impedance device across said armature winding, a field excitation circuit including a potentiometer having a movable tap and a resistor connected in series with the potentiometer, circuit means for connecting said field winding between said movable tap and the side of said resistor remote from said potentiometer, and circuit means responsive to movement of said selector switch to said one position for shunting said resistor.

EARL H. HORNBARGER.

REFERENCES CITED

The following references are of record in the file of this patent:

UNITED STATES PATENTS

| Number | Name | Date |
|---|---|---|
| 2,285,195 | Edwards | June 2, 1942 |
| 2,363,377 | Wrathall | Nov. 21, 1942 |
| 2,430,310 | Stratton | Nov. 4, 1947 |

FOREIGN PATENTS

| Number | Country | Date |
|---|---|---|
| 391,613 | Great Britain | May 4, 1933 |